Nov. 17, 1953

M. R. GARNIER ET AL
HOLLOW DRIVE SHAFT CONSTRUCTION
FOR TURBINE DRIVEN COMPRESSORS 2,659,530

Filed July 9, 1948

Inventors

MICHEL R. GARNIER AND JULES C.J. POUJADE
By   Linton and Linton
Attorneys

Nov. 17, 1953
M. R. GARNIER ET AL
2,659,530
HOLLOW DRIVE SHAFT CONSTRUCTION FOR TURBINE DRIVEN COMPRESSORS
Filed July 9, 1948
2 Sheets-Sheet 2
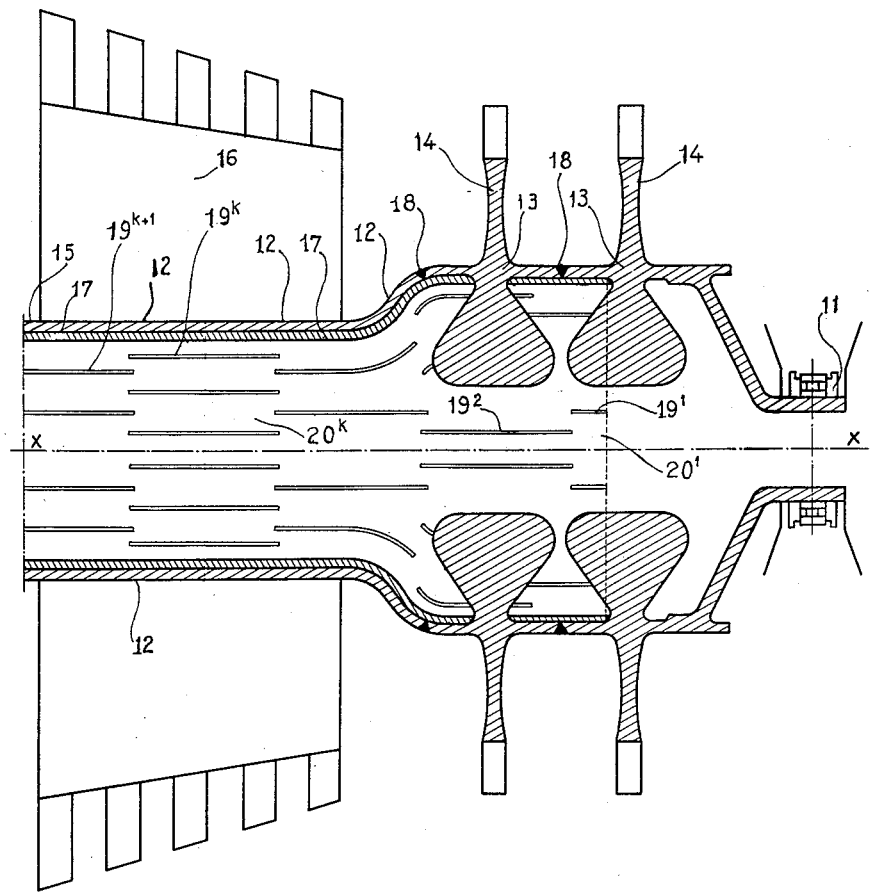
Fig. 2
Fig. 3
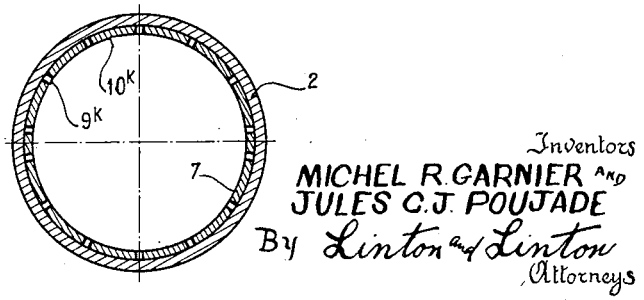
Inventors
MICHEL R. GARNIER AND
JULES C. J. POUJADE
By Linton and Linton
Attorneys Patented Nov. 17, 1953

2,659,530

UNITED STATES PATENT OFFICE 2,659,530

HOLLOW DRIVE SHAFT CONSTRUCTION FOR TURBINE DRIVEN COMPRESSORS

Michel Robert Garnier and Jules Cyprien Joseph Poujade, Paris, France, assignors to Societe dite: Societe Nationale d'Etude et de Construction de Moteurs d'Aviation, Societe Anonyme, Paris, France, a French company Application July 9, 1948, Serial No. 37,953

Claims priority, application France July 11, 1947

6 Claims. (Cl. 230—116)

In gas turbines one at least of the bearings of the rotor shaft is disposed in proximity to the part of this shaft carrying the motor vane rotors. This bearing is in consequence submitted to high temperatures which are prejudicial to its good functioning.

Sometimes, as is the case in certain motor groups, particularly in the motor group which is shown in Fig. 3 of the drawings appended to our co-pending application Serial No. 790,278 of December 8, 1947, for "Improvements in and relating to motor groups," two gas turbines are arranged in succession on independent coaxial shafts. In such a case, the bearings carrying the adjacent ends of the two independent shafts are subjected to temperatures which are even higher than in the preceding case by reason of their position between the two gas turbines of the group, the efficient functioning of these bearings presents greater difficulties than in the preceding case.

The object of the present invention is to reduce these defects. The present invention provides a gas turbine having means for conveying a part of the heat received by its rotor towards a relatively cold part of the shaft of this rotor.

The present invention further provides a turbine of the above mentioned type in which the shaft of the rotor is made hollow, and provided internally with a lining made of a material having a higher coefficient of thermal conductivity than that of the material forming the shaft. Preferably according to the present invention, this lining is formed by a copper tube which is fixed to the hollow shaft supporting the rotor of the said turbine.

According to a particular method of carrying out the invention, this lining is provided with longitudinal slits spread over the whole of its circumference and in groups arranged over all its length in order to increase its elasticity and thus allowing it to be pressed automatically and perfectly by centrifugal force, against the internal face of the hollow shaft of the rotor of the said gas turbine, during the operation of the latter.

Further, according to the present invention, in the assembly of successive groups of longitudinal slits, the slits are in groups and the slits of each group are staggered with respect to the slits of the adjacent group.

Finally, according to a preferred form of the present invention, in a construction in which a compressor is mounted on the shaft of the rotor of the turbine, means for conveying heat received by this rotor towards a cold part of its shaft extend beyond this axial compressor relative to the rotor of the turbine.

The present invention comprises any turbine constructed in accordance with the principles defined above, as well as any unit made of a turbine and an apparatus adapted to receive the power developed by the said turbine, and in which the said turbine is constructed in accordance with the said principles.

The diagrammatic drawings appended given by way of example, and which do not in any way limit the scope of the present invention, show two turbine rotors constructed in accordance with the above defined principles.

In the drawings:

Fig. 2 is an axial longitudinal section taken through a modified form of hollow shaft of a gas turbine having a plurality of rotors for driving a compressor.

Fig. 3 is a section of the hollow shaft taken at right angles to its axis, along the line III—III of Fig. 1.

Figure 1:
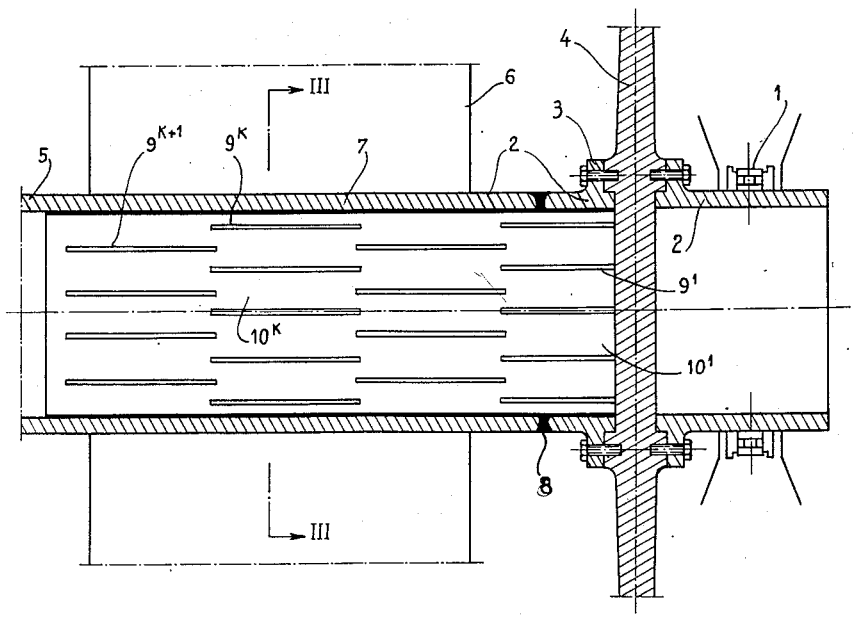
Fig. 1 is a longitudinal section taken through the hollow shaft of a first gas turbine rotor for driving a compressor.

In Fig. 1, 1 is the bearing to be protected against temperatures which might affect its operation. 2 is the hollow shaft received by this bearing and carrying at 3 the rotor 4 of the gas turbine; 5 is the cold part of the shaft situated in front of an axial compressor 6 connected to the same shaft for rotation therewith.

In accordance with the invention a lining 7, made of a metal of higher coefficient of thermal conductivity than that of the metal (steel) forming the hollow shaft 2, is fixed by brazing at points 8 to the interior of this shaft. This lining is preferably of copper, and is provided with elongated longitudinal slits $9^1 \ldots 9^k, 9^{k+1}$, in staggered sets along its whole length. These slits break up each of the transverse sections of the tube into elements $10^1 \ldots 10^k, 10^{k+1}$ distinct from one another and which during operation of the turbine are subject to centrifugal force which presses them against the internal face of the hollow shaft 2 thus creating a perfect contact of these elements with this the hollow shaft, and as a result an excellent transmission to these elements of the heat received by this the hollow shaft 2. The transmission of this heat from the hot end of the tubular lining 7 to its cold end is ensured by the full parts of this tubular lining existing between the longitudinal slits and by the arrangement in successive staggered sets of slits such as $9^k, 9^{k+1}$.

Finally the compressor 6 of the axial compressor on the shaft 2 accelerates the removal of the heat coming from the gas rotor 4.

In Fig. 2, the apparatus shown is similar to that shown in Fig. 1. It differs therefrom only in the substitution of two gas turbine rotors 14—14 for the rotor 4 of Figure 1, and in the diameter of the shaft 12 varying throughout its length as does the lining 17 made of a metal of higher coefficient of thermal conductivity than the metal of said shaft 12. Said liner 17 is also provided with longitudinal slits 19' in staggered sets along the entire length thereof and following the contour of said lining forming a transverse section of the tubes into elements 20'. The lining 17 is fixed by brazing the points 18 to the interior of shaft 12. Bearing 11 is protected by the aforementioned structure.

Fig. 3, which is a transverse section of the hollow shaft of Fig. 1, shows the longitudinal bands $10^k$ formed in the lining 7 by the longitudinal slits $9^k$ in that section of the tube under consideration.

We declare that what we claim is:

1. An improvement in rotor shafts for gas turbines comprising a hollow rotor shaft, a tube formed by a material having a considerably higher coefficient of thermal conductivity than the material forming said shaft and positioned within said shaft in contact therewith, said tube having staggered groups of slits formed therethrough throughout its length and means connecting said tube to said shaft.

2. In a gas turbine a rotor, a hollow rotor shaft directly connected to said rotor and extending axially from said rotor, said hollow shaft having an outer solid wall, an inner lining made of a material having a considerably higher coefficient of thermal conductivity than that of the material forming said outer wall, said inner lining having staggered groups of slits formed therethrough throughout its length and means connecting said inner lining to said outer wall.

3. In a gas turbine a rotor, a hollow rotor shaft directly connected to said rotor and extending axially from said rotor, a rotary compressor mounted on and connected to said shaft and spaced thereon from said rotor, said hollow shaft having an outer solid wall, an inner lining made of a material having a considerably higher coefficient of thermal conductivity than that of the material forming said outer wall, said inner lining having longitudinally extending slits formed therethrough at intervals throughout its length and means connecting said inner lining to said outer wall.

4. In a gas turbine a rotor, a hollow rotor shaft directly connected to said rotor and extending axially from said rotor, a rotary compressor mounted on and connected to said shaft and spaced thereon from said rotor, said hollow shaft having an outer solid wall, an inner lining made of a material having a considerably higher coefficient of thermal conductivity than that of the material forming said outer wall, said inner lining having staggered groups of longitudinal slits formed at intervals therethrough throughout its length and means connecting said inner lining to said outer wall.

5. In a gas turbine a plurality of driving rotors, a hollow rotor shaft directly connected to one of said rotors and extending axially from said rotors, a rotary compressor mounted on and connected to said shaft and spaced thereon from said rotors, said hollow shaft having an outer solid wall, an inner lining made of a material having a considerably higher coefficient of thermal conductivity than that of the material forming said outer wall, said inner lining having longitudinally extending slots formed therethrough at intervals throughout its length, and means connecting said inner lining to said outer wall.

6. In a gas turbine a plurality of driving rotors, a hollow rotor shaft directly connected to one of said rotors and extending axially from said rotors, a rotary compressor mounted on and connected to said shaft and spaced thereon axially from said rotors, said hollow shaft having an outer solid wall, an inner lining made of a material having a considerably higher coefficient of thermal conductivity than that of the material forming said outer wall, said inner lining having staggered groups of longitudinal slits formed therethrough and at intervals throughout its length and means connecting said inner lining to said outer wall.

MICHEL ROBERT GARNIER.
JULES CYPRIEN JOSEPH POUJADE.

References Cited in the file of this patent

UNITED STATES PATENTS

| Number | Name | Date |
| --- | --- | --- |
| 2,175,470 | Kice, Jr. | Oct. 10, 1939 |
| 2,216,731 | Birmann | Oct. 8, 1940 |
| 2,229,799 | Dean | Jan. 28, 1941 |
| 2,395,097 | Buck | Feb. 19, 1946 |
| 2,474,404 | Richeson | June 28, 1949 |

FOREIGN PATENTS

| Number | Country | Date |
| --- | --- | --- |
| 649,465 | Great Britain | Jan. 24, 1951 |